(12) United States Patent
Acedo et al.

(10) Patent No.: US 8,346,721 B2
(45) Date of Patent: Jan. 1, 2013

(54) APPARATUS AND METHOD TO REPLICATE REMOTE VIRTUAL VOLUMES TO LOCAL PHYSICAL VOLUMES

(75) Inventors: Mario Francisco Acedo, Tucson, AZ (US); Ezequiel Cervantes, Tucson, AZ (US); Paul Anthony Jennas, II, Tucson, AZ (US); Jason Lee Peipelman, Tucson, AZ (US); Matthew John Ward, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 12/503,779

(22) Filed: Jul. 15, 2009

(65) Prior Publication Data

US 2011/0016082 A1 Jan. 20, 2011

(51) Int. Cl.
*G06F 7/00* (2006.01)
*G06F 17/00* (2006.01)

(52) U.S. Cl. ...................................... 707/610
(58) Field of Classification Search .................... 707/610
See application file for complete search history.

(56) References Cited

U.S. PATENT DOCUMENTS

| 3,340,776 | A | 9/1967 | Shabram |
| 4,340,076 | A | 7/1982 | Weitzen |
| 4,340,776 | A | 7/1982 | Ganz et al. |
| 7,239,636 | B2 | 7/2007 | Kadambi et al. |
| 7,882,060 | B2 | 2/2011 | Acedo et al. |
| 2002/0016792 | A1* | 2/2002 | Ito et al. ..................... 707/200 |
| 2003/0126327 | A1* | 7/2003 | Pesola et al. ................. 710/74 |
| 2004/0186837 | A1 | 9/2004 | Lambert et al. |
| 2006/0182103 | A1 | 8/2006 | Martini et al. |
| 2007/0174410 | A1 | 7/2007 | Croft et al. |
| 2008/0235448 | A1* | 9/2008 | Inoue et al. ................. 711/114 |
| 2009/0198699 | A1 | 8/2009 | Acedo et al. |
| 2009/0254468 | A1 | 10/2009 | Acedo et al. |

* cited by examiner

*Primary Examiner* — Van Oberly
(74) *Attorney, Agent, or Firm* — Dale F. Regelman; Quarles & Brady LLP (57) ABSTRACT

An automated method to replicate remote virtual files to local physical files is presented, wherein the method provides a replication algorithm comprising computer readable program code that can be used by a programmable computer processor to replicate the (N) remote virtual volumes to (N) local physical volumes, such that a computing device integral with those (N) local physical volumes can read data from, and write data to, each of the locally replicated virtual volumes without modifying volume assignments and without reconfiguring the computing device to communicate with the (N) local physical volumes.

16 Claims, 7 Drawing Sheets

APPARATUS AND METHOD TO REPLICATE REMOTE VIRTUAL VOLUMES TO LOCAL PHYSICAL VOLUMES

FIELD OF THE INVENTION

The invention relates to methods and systems for replicating a remote virtual array site onto an array site local to a computing device.

BACKGROUND OF THE INVENTION

Remote virtual array sites present data and/or files to a user, wherein the data or files are abstracted from one or more remote physical data storage devices or arrays. Although there can be many practical reasons to employ such virtual array sites, performance will generally be enhanced when data is instead saved using storage devices/media local to the a requesting computing device.

Using prior art methods, conversion of a remote virtual array site to an array site local to the host computer tends to be difficult, time-consuming and error-prone. In addition, prior art manual methods are quite expensive because of the required skills of one or more Information Technology professionals.

SUMMARY OF THE INVENTION

An automated method to replicate remote virtual volumes to local physical volumes is presented. The method provides a replication algorithm that comprises computer readable program code that can be used by a programmable computer processor to replicate (N) remote virtual volumes to (N) local physical volumes, such that a computing device in communication with those (N) local physical volumes can read data from, and write data to, each of the locally replicated virtual volumes without modifying volume assignments and without reconfiguring the computing device to communicate with the (N) local physical volumes.

A storage controller is presented, wherein that storage controller comprises computer readable program code encoded in a computer readable medium disposed therein to replicate remote virtual volumes to local physical volumes is presented. The computer readable program code can be used by a programmable computer processor to replicate (N) remote virtual volumes to (N) local physical volumes, such that a computing device in communication with those (N) local physical volumes can read data from, and write data to, each of the locally replicated virtual volumes without modifying volume assignments and without reconfiguring the computing device to communicate with the (N) local physical volumes.

A replication algorithm is presented, wherein that replication algorithm comprises computer readable program code encoded in a computer readable medium disposed therein to replicate remote virtual volumes to local physical volumes is presented. The replication algorithm can be used by a programmable computer processor to replicate (N) remote virtual volumes to (N) local physical volumes, such that a computing device in communication with those (N) local physical volumes can read data from, and write data to, each of the locally replicated virtual volumes without modifying volume assignments and without reconfiguring the computing device to communicate with the (N) local physical volumes.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 5A:
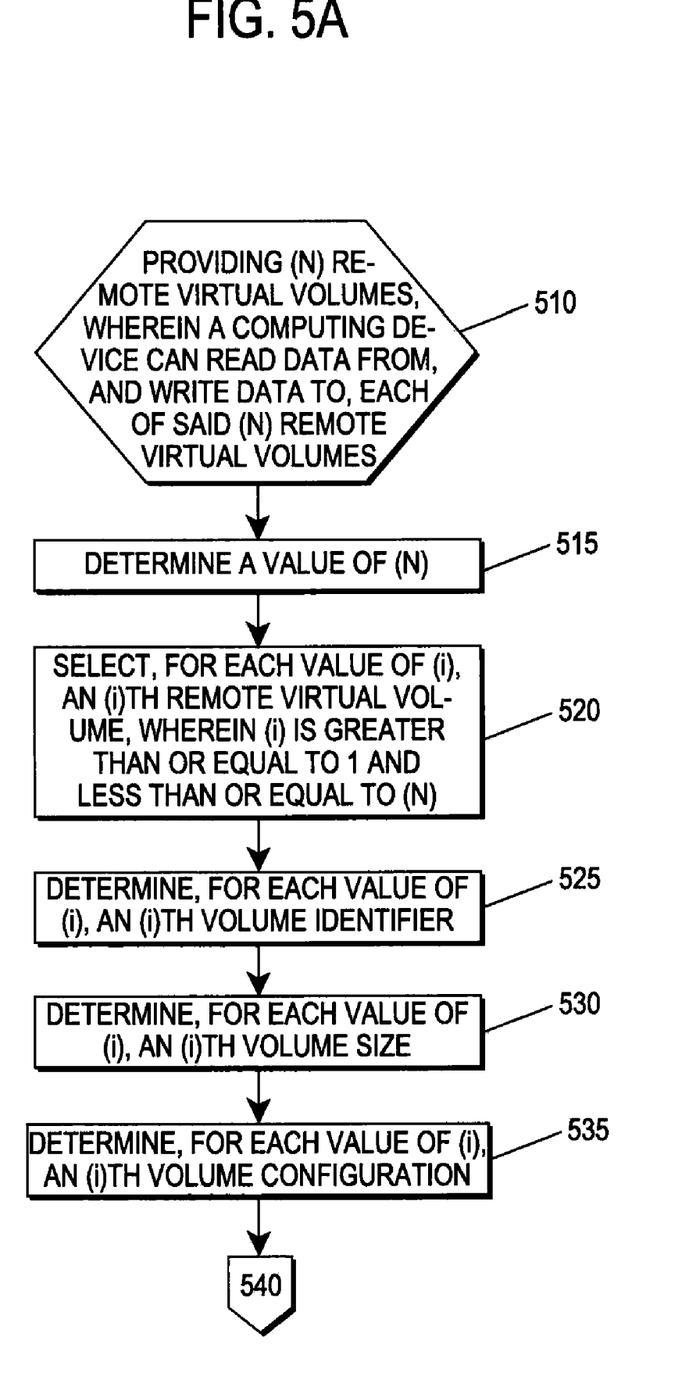
FIG. 5A is a flow chart summarizing certain steps in Applicants' method.
Figure 5B:
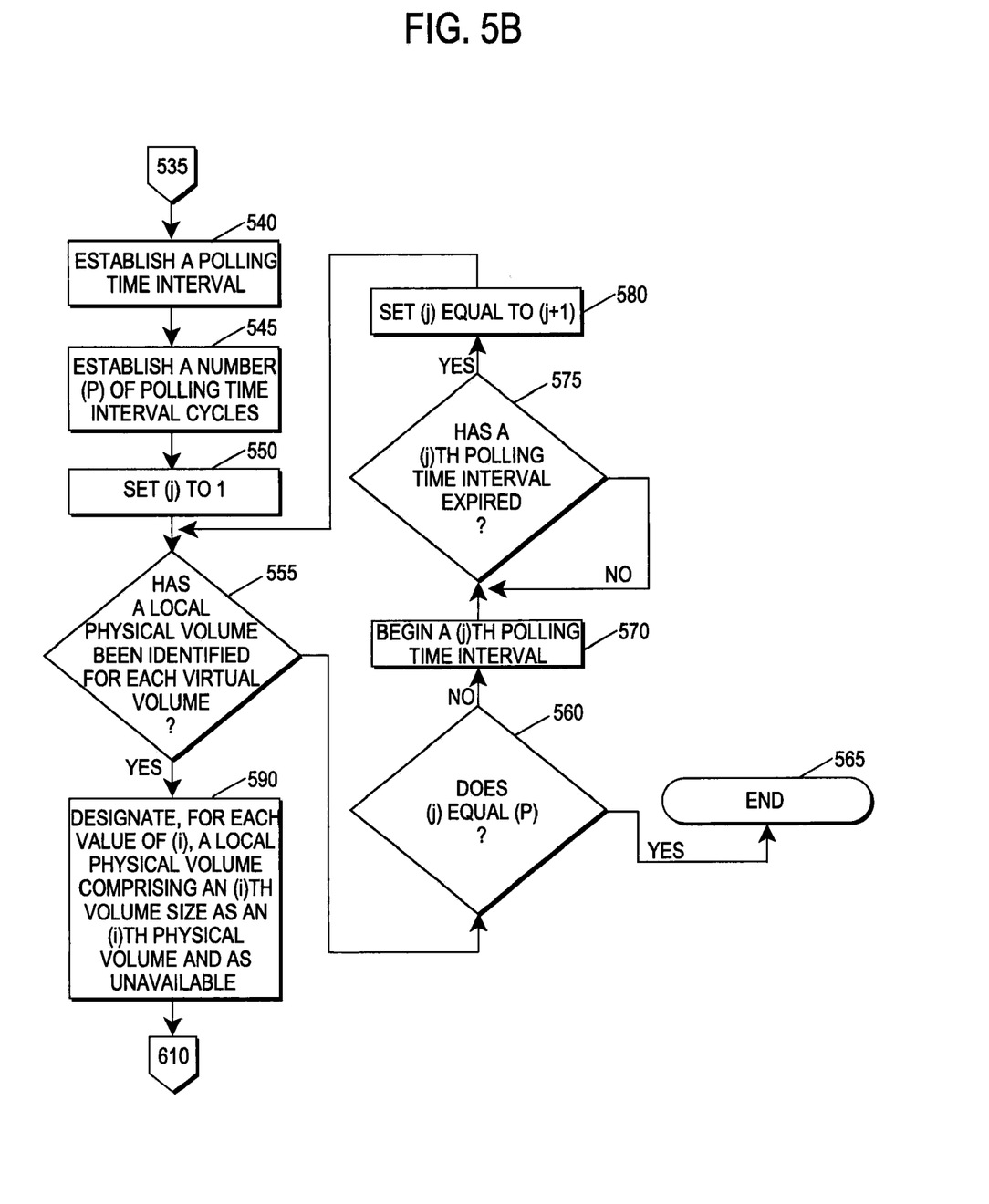
FIG. 5B is a flow chart summarizing additional steps in Applicants' method.
Figure 6:
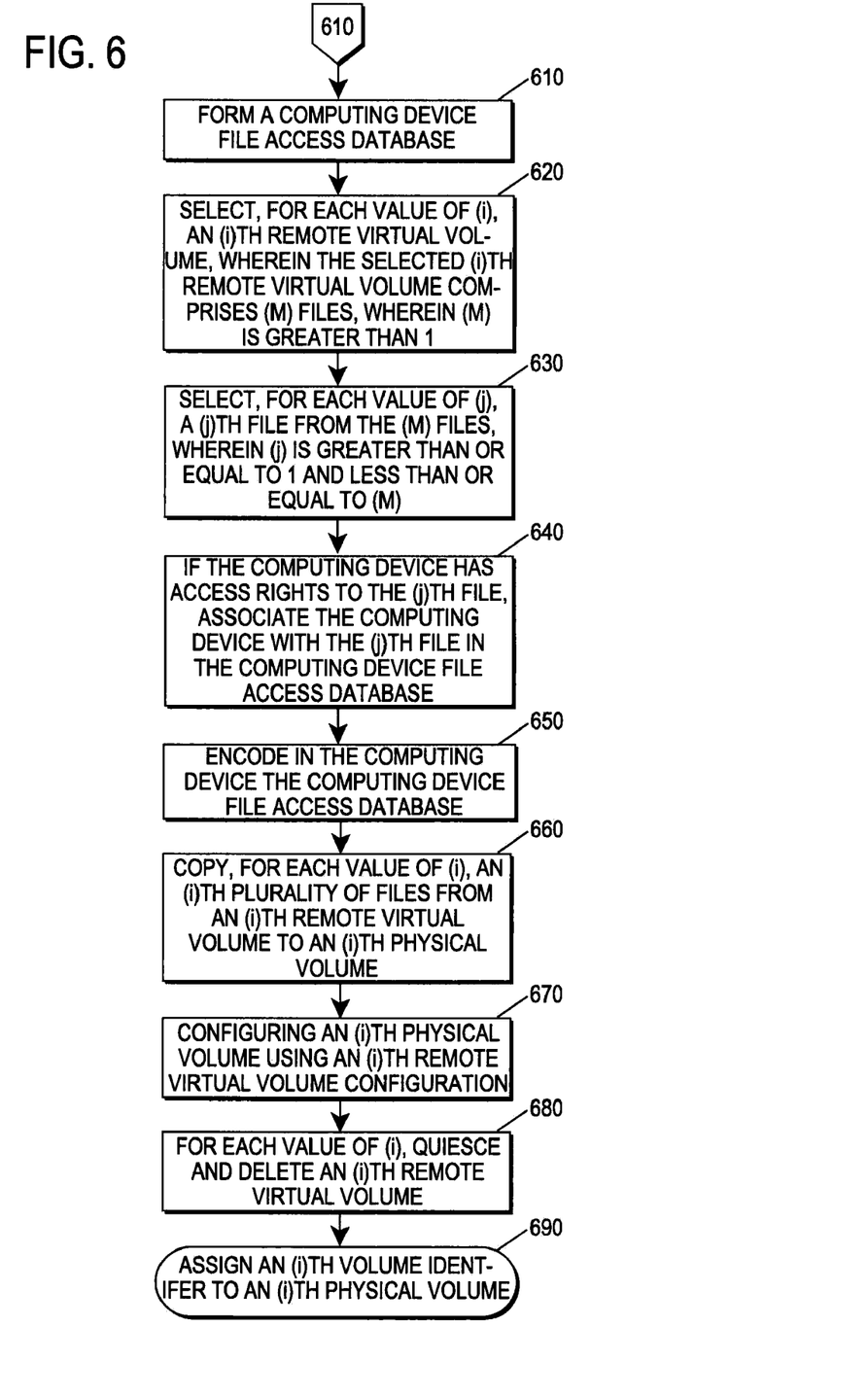
FIG. 6 is a flow chart summarizing additional steps in Applicants' method.

The schematic flow chart diagram included are generally set forth as a logical flow-chart diagram (e.g., FIGS. 5A, 5B, and 6). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIGS. 5A, 5B, and 6). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Certain functional units described in this specification have been labeled as modules (e.g., virtualization module 139) in order to more particularly emphasize their implementation independence. For example, virtualization module 139 may be implemented as a hardware circuit comprising custom VLSI circuits or gate arrays, off-the-shelf semiconductors such as logic chips, transistors, or other discrete components. Virtualization module 139 may also be implemented in programmable hardware devices such as field programmable gate arrays, programmable array logic, programmable logic devices, or the like.

Virtualization module 139 may also be implemented in software for execution by various types of processors. An identified module of executable code may, for instance, comprise one or more physical or logical blocks of computer instructions which may, for instance, be organized as an object, procedure, or function. Nevertheless, the executables of virtualization module 139 need not be physically collocated, but may comprise disparate instructions stored in different locations which, when joined logically together, comprise the module and achieve the stated purpose for the module.

Indeed, virtualization module 139 may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
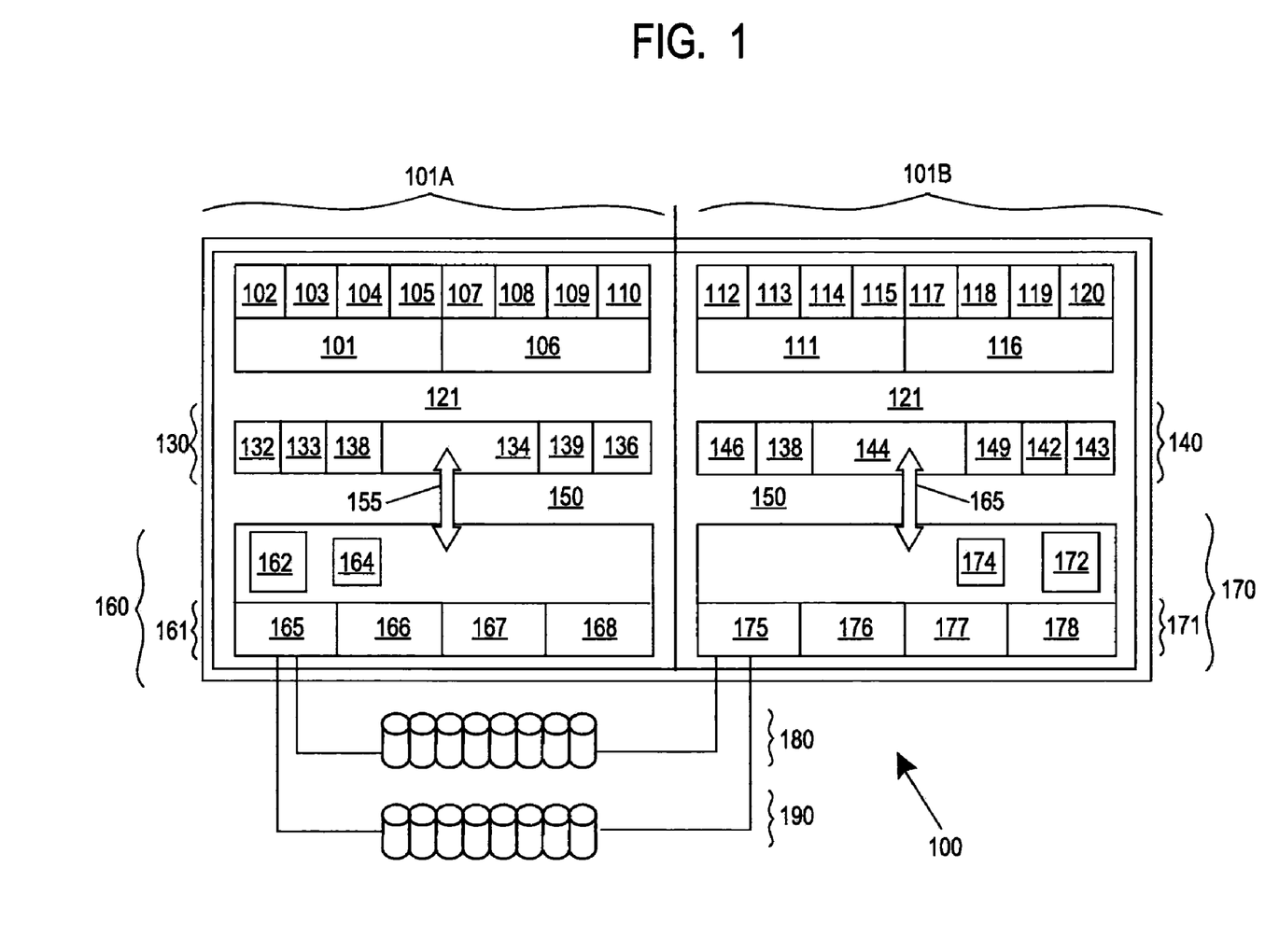
FIG. 1 is a block diagram showing the elements of Applicants' data storage library.
Figure 2:
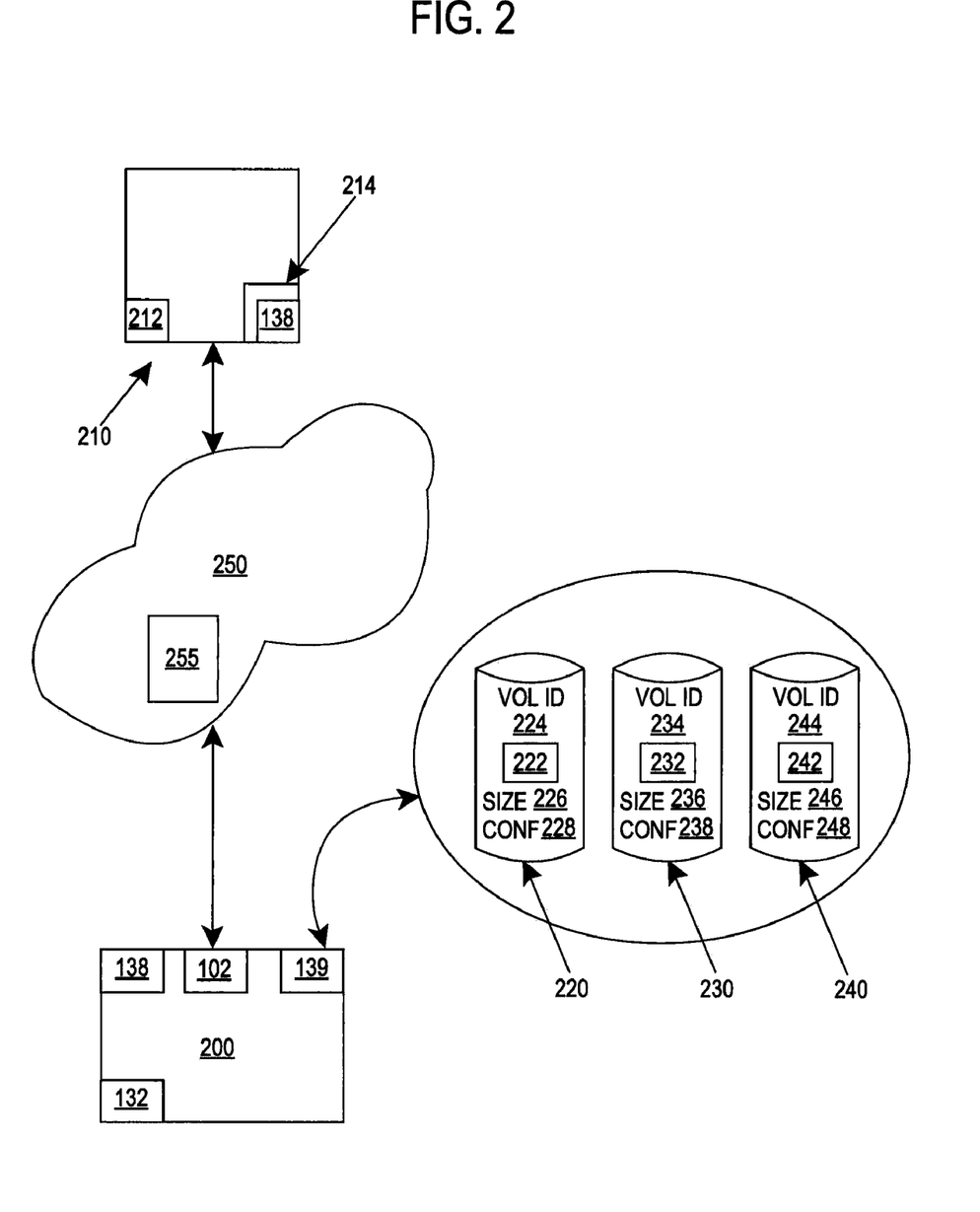
FIG. 2 is a block diagram showing a computing device in communication with a storage controller, such as the data storage library of FIG. 1, where the storage controller presents a plurality of virtual volumes to the computing device.

In the illustrated embodiment of FIG. 2, computing device 210 comprises a processor 212 and computer readable medium 214, wherein computer readable program code 138 (FIGS. 1, 2, 3, 4) is encoded in computer readable medium 214. In certain embodiments computing device 210 comprises a mainframe computer, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In certain embodiments, computing device 210 generates data, and provides that data to storage controller 200 via communication fabric 250. In certain embodiments, communication fabric comprises one or more switches 255. In certain embodiments, those one or more switches 255 include one or more conventional router switches. In the illustrated embodiment of FIG. 2, one or more switches 255 interconnect computing device 210 to storage controller 200 using any type of I/O interface, for example, a Fibre Channel ("FC"), Infiniband, Gigabit Ethernet, Ethernet, TCP/IP, iSCSI, SCSI I/O interface, or one or more signal lines used by switch 255 to transfer information through, to, and from storage controller 200, and subsequently a plurality of physical data storage devices.

Applicants' storage controller 200 comprises virtualization module 139, wherein virtualization module 139, using data encoded in a plurality of physical data storage devices, creates virtual volumes 220, 230, and 240. Data provided by computing device 210, and encoded in a plurality of physical data storage devices, is presented to computing device 210 as virtual volumes 220, 230, and 240. Virtual volume 220 comprises volume identifier 224, a plurality of files 222, a volume size 226 comprising, for example and without limitation, megabytes or gigabytes, and a volume configuration 228. In certain embodiments, configuration 228 comprises a RAID protocol. Similarly, virtual volumes 230 and 240 comprise volume identifiers 234 and 244, respectively, a plurality of files 232 and 242, respectively, volume sizes 236 and 246, respectively, and volume configurations 238 and 248, respectively.

References herein to a "file" should be construed to mean a block of storage space. In certain embodiments, the size of such a block of storage space is determined by an owner of the data encoded in that block of storage space. In certain embodiments, the size of such a block of storage space is determined by an owner and/or operator of a storage controller in communication with a data storage device that comprises the block of storage space. Similarly, references herein to a "plurality of files," mean a plurality of arbitrarily-defined blocks of storage space.

Referring now to FIG. 1, in certain embodiments, storage controller 200 comprises a data storage library, such as for example and without limitation, data storage library 100. In certain implementations, data storage library 100 includes a first cluster 101A and a second cluster 101B, wherein clusters 101A and 101B are disposed in the same housing. In the illustrated implementation of FIG. 1, data storage library 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may include one or more Fibre Channel ports, one or more FICON ports, one or more ESCON ports, or one or more SCSI ports. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage library 100.

Storage controller portion 130 includes processor 132, computer readable medium 133, cache 134, and nonvolatile storage ("NVS") 136. In certain implementations, computer readable medium 133 includes random access memory. In certain implementations, computer readable medium 133 includes non-volatile memory.

Storage controller portion 140 includes processor 142, computer readable medium 133, cache 144, and NVS 146. In certain embodiments, computer readable medium 143 includes random access memory. In certain embodiments, computer readable medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 1, sixteen physical data storage devices are organized into two arrays. In other embodiments, the data storage system includes more than two physical storage device arrays. In certain embodiments, each physical storage array appears to computing device as one or more of virtual volumes 220, 230, and/or 240.

In certain embodiments, arrays 180 and/or 190 utilize a RAID (Redundant Array of Independent Disks) protocol. In certain embodiments, arrays 180 and/or 190 include what is sometimes called a JBOD array, i.e. "Just a Bunch Of Disks" where the array is not configured according to RAID. As those skilled in the art will appreciate, a RAID rank includes independent disk drives configured in an array of disk drives to obtain performance, capacity and/or reliability that exceeds that of a single large drive.

FIGS. 5A and 5B summarizes the initial steps of Applicants' method to replicate by algorithm rather than manually a plurality of remote virtual volumes to a corresponding plurality of local physical volumes. Referring now to FIG. 5A, in step 510 the method provides (N) virtual volumes, wherein (N) is greater than or equal to 1, such as and without limitation virtual volumes 220 (FIGS. 2, 3), 230 (FIGS. 2, 3), and 240 (FIGS. 2, 3), wherein a computing device, such as computing device 210 (FIGS. 2, 3, 4) can read data from, and write data to, those virtual volumes, and wherein the virtual volumes are remote from the computing device. By "remote from the computing device," Applicants' mean the computing device has access to the virtual volumes only through use of a communication fabric or network, such as for example communication fabric 250 and/or the Internet. In certain embodiments, the computing device of step 510 has access to the virtual volumes of step 510 using a communication fabric or the Internet to communicate with a storage controller, such as storage controller 200, wherein the storage controller comprises a virtualization module, such as virtualization module 139, wherein that virtualization module presents the virtual volumes to the host computer.

In step 515, the method determines a value for (N). In certain embodiments, step 515 is performed by the computing device of step 510. In certain embodiments, step 515 is performed by Applicants' replication algorithm encoded in a computer readable medium disposed in the computing device of step 510. In certain embodiments, step 515 is performed by Applicants' replication algorithm encoded in a computer readable medium disposed in a storage controller in communication with the computing device of step 510.

In step 520, the method selects seriatim each remote virtual volume. In certain embodiments, step 520 is performed by the computing device of step 510. In certain embodiments, step 52 is performed by Applicants' replication algorithm encoded in a computer readable medium disposed in the computing device of step 510. In certain embodiments, step 52 is performed by Applicants' replication algorithm encoded in a computer readable medium disposed in a storage controller in communication with the computing device of step 510.

In step 525 the method determines, for each value of (i), an (i)th volume identifier, such as for example volume identifier 224, or 234, or 244, wherein (i) is greater than or equal to 1, and less than or equal to (N). In certain embodiments, step 525 is performed by the computing device of step 510. In certain embodiments, step 525 is performed by Applicants' replication algorithm encoded in a computer readable medium disposed in the computing device of step 510. In certain embodiments, step 525 is performed by Applicants' replication algorithm encoded in a computer readable medium disposed in a storage controller in communication with the computing device of step 510.

In step 530, the method determines, for each value of (i), an (i)th volume size, such as for example volume size 226, or 236, or 246. In certain embodiments, step 530 is performed by the computing device of step 510. In certain embodiments, step 530 is performed by Applicants' replication algorithm encoded in a computer readable medium disposed in the computing device of step 510. In certain embodiments, step 530 is performed by Applicants' replication algorithm encoded in a computer readable medium disposed in a storage controller in communication with the computing device of step 510.

In step 535, the method determines, for each value of (i), an (i)th volume configuration, such as for example volume configuration 228, or 238, or 248. In certain embodiments, step 535 is performed by the computing device of step 510. In certain embodiments, step 535 is performed by Applicants' replication algorithm encoded in a computer readable medium disposed in the computing device of step 510. In certain embodiments, step 535 is performed by Applicants' replication algorithm encoded in a computer readable medium disposed in a storage controller in communication with the computing device of step 510.

In the illustrated embodiment of FIG. 2, computing device 210 is not in communication with any local physical volumes. Rather in embodiments wherein storage controller 200 comprises a data storage library 100, computing device can only read and/or write data to remote physical storage devices, such as for example and without limitation physical storage array 180 and/or physical storage array 190.

In certain embodiments, computing device 210 can be relocated to different geographical locations, such as and without limitation, Olympic games, political conventions, political candidate debates, funerals, inaugurations, and the like. In such embodiments, computing device may not have access to any local storage devices. Computing device 210 can, however, using the illustrated embodiment of FIGS. 1 and 2, save data generated by computing device 210 to remote physical storage arrays 180 and/or 190, wherein that data is presented to computing device as one or more virtual volumes 220, 230, and/or 240. By "data," Applicants' mean, without limitation, text files, picture files, media files, sound files, and the like.

At the expiration an event whereat computing device 210 is temporarily disposed, computing device 210 may be moved to a different location, wherein computing device 210 has access to local storage devices at the new location. For example in the illustrated embodiment of FIG. 3, computing device is in communication with a local physical storage array 320. In certain embodiments, local physical storage array 320 is integral with computing device 210. In certain embodiments, local physical storage array 320 is disposed in the same building as is computing device 210. In certain embodiments, local physical storage array 320 is located less than about one kilometer from computing device 210.

Figure 3:
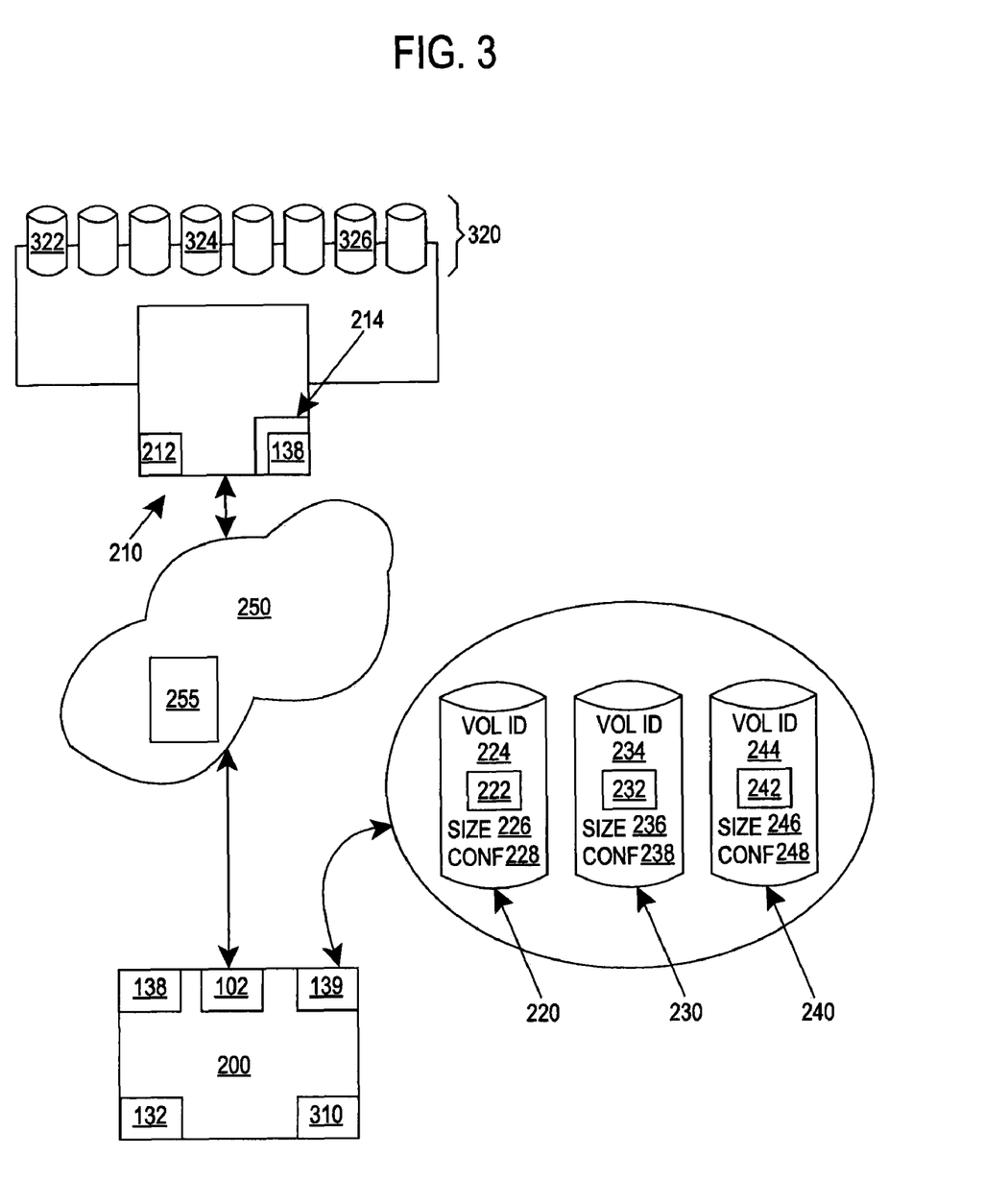
FIG. 3 is a block diagram showing the computing device of FIG. 2 in communication with a local physical storage array.
Figure 4:
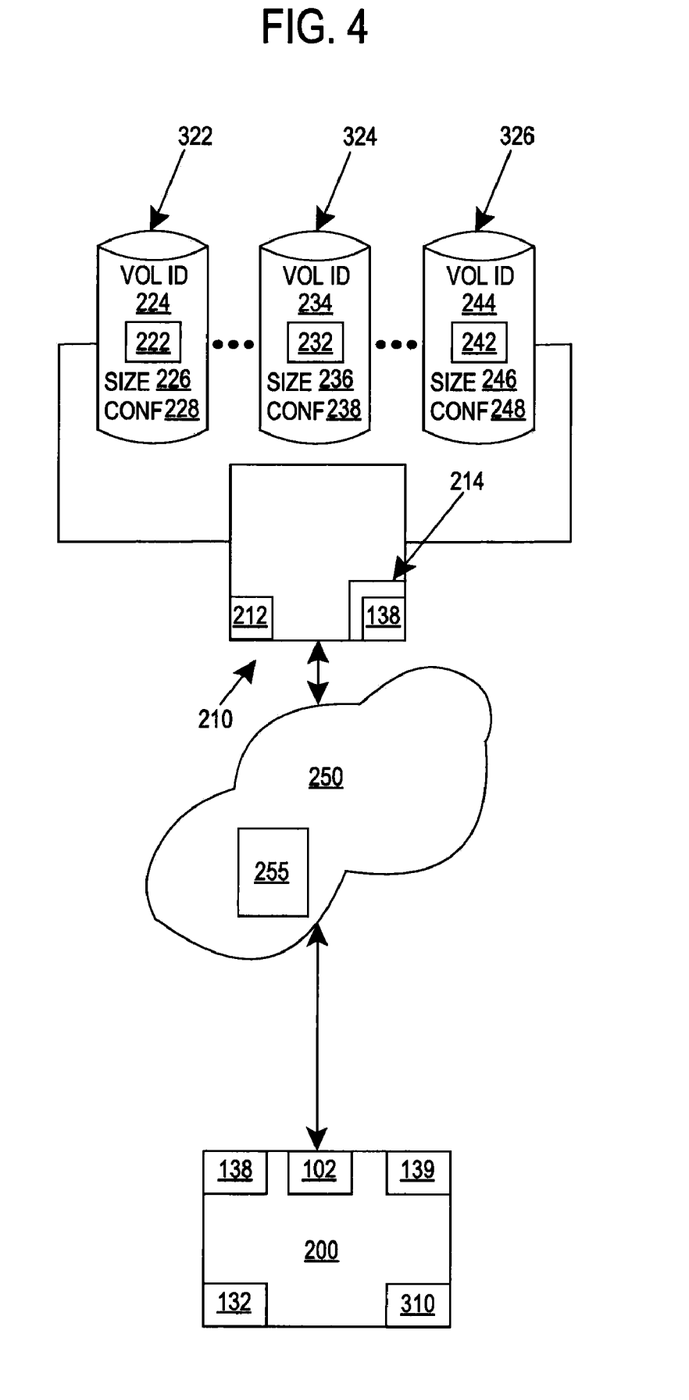
FIG. 4 is a block diagram showing the virtual volumes of FIG. 2 mapped onto the local physical array of FIG. 3.

In certain embodiments, local physical storage array 320 comprises a plurality of data storage devices each comprising a magnetic data storage medium in combination with the hardware, firmware, and/or software needed to write data to, and read data from, that magnetic data storage medium.

In certain embodiments, local physical storage array 320 comprises a plurality of data storage devices each comprising an optical data storage medium in combination with the hardware, firmware, and/or software needed to write data to, and read data from, that optical data storage medium.

In certain embodiments, local physical storage array 320 comprises a plurality of data storage devices each comprising an electronic data storage medium in combination with the hardware, firmware, and/or software needed to write data to, and read data from, that electronic data storage medium.

In certain embodiments, local physical storage array 320 comprises a plurality of data storage devices each comprising a holographic data storage medium in combination with the hardware, firmware, and/or software needed to write data to, and read data from, that holographic data storage medium.

Referring to FIG. 5B, in step 540 the method sets a polling time interval. In certain embodiments, step 540 is performed by the computing device of step 510. In certain embodiments, step 540 is performed by Applicants' replication algorithm encoded in a computer readable medium disposed in the computing device of step 510. In certain embodiments, step 540 is performed by Applicants' replication algorithm encoded in a computer readable medium disposed in a storage controller in communication with the computing device of step 510.

In step 545, the method sets a number (P) of polling time interval cycles. In certain embodiments, step 545 is performed by the computing device of step 510. In certain embodiments, step 545 is performed by Applicants' replication algorithm encoded in a computer readable medium disposed in the computing device of step 510. In certain embodiments, step 545 is performed by Applicants' replication algorithm encoded in a computer readable medium disposed in a storage controller in communication with the computing device of step 510.

In step 550, the method sets (P) to 1. In certain embodiments, step 550 is performed by the computing device of step 510. In certain embodiments, step 550 is performed by Applicants' replication algorithm encoded in a computer readable medium disposed in the computing device of step 510. In certain embodiments, step 550 is performed by Applicants' replication algorithm encoded in a computer readable medium disposed in a storage controller in communication with the computing device of step 510.

In step 555, the method determines, for each value of (i), an available local physical volume can be identified for each virtual volume, i.e. if an available local physical volume comprises an (i)th volume size. In certain embodiments, step 555 is performed by the computing device of step 510. In certain embodiments, step 555 is performed by Applicants' replication algorithm encoded in a computer readable medium disposed in the computing device of step 510. In certain embodiments, step 555 is performed by Applicants' replication algorithm encoded in a computer readable medium disposed in a storage controller in communication with the computing device of step 510.

If the method determines in step 555 that, for each value of (i), an available local physical volume cannot be identified for each virtual volume, then the method transitions from step 555 to step 560 wherein the method determines if (j) equals (P). In certain embodiments, step 560 is performed by the computing device of step 510. In certain embodiments, step 560 is performed by Applicants' replication algorithm encoded in a computer readable medium disposed in the computing device of step 510. In certain embodiments, step 560 is performed by Applicants' replication algorithm encoded in a computer readable medium disposed in a storage controller in communication with the computing device of step 510.

If the method determines in step 560 that (j) equals (P), then the method transitions from step 560 to step 565 and ends. Alternatively, if the method determines in step 560 that (j) does not equal (P), then the method transitions from step 560 to step 570 wherein the method begins a (j)th polling time interval. In certain embodiments, step 570 is performed by the computing device of step 510. In certain embodiments, step 570 is performed by Applicants' replication algorithm encoded in a computer readable medium disposed in the computing device of step 510. In certain embodiments, step 570 is performed by Applicants' replication algorithm encoded in a computer readable medium disposed in a storage controller in communication with the computing device of step 510.

In step 575, the method determines if the (j)th polling time interval has expired. In certain embodiments, step 575 is performed by the computing device of step 510. In certain embodiments, step 575 is performed by Applicants' replication algorithm encoded in a computer readable medium disposed in the computing device of step 510. In certain embodiments, step 575 is performed by Applicants' replication algorithm encoded in a computer readable medium disposed in a storage controller in communication with the computing device of step 510.

If the method determines in step 575 that a (j)th polling time interval has not expired, then the method pauses until the (i)th polling time interval has expired. If the method determines in step 575 that the (j)th polling time interval has expired, then the method transitions from step 575 to step 580 wherein the method sets (j) equal to (j+1). The method transitions from step 580 to step 555 and continues as described herein. In certain embodiments, step 580 is performed by the computing device of step 510. In certain embodiments, step 580 is performed by Applicants' replication algorithm encoded in a computer readable medium disposed in the computing device of step 510. In certain embodiments, step 580 is performed by Applicants' replication algorithm encoded in a computer readable medium disposed in a storage controller in communication with the computing device of step 510.

If the method determines in step 555 that, for each value of (i), an available local physical volume comprises an (i)th volume size, then the method transitions from step 555 to step 590 wherein the method designates, for each value of (i), a local physical volume comprising an (i)th volume size as an (i)th physical volume. Further in step 590, the method designates that (i)th physical volume as unavailable.

Applicants' method transitions from step 590 to step 610 (FIG. 6). Referring now to FIG. 6, in step 610 the method forms a computing device file access database, such as for example database 310 (FIG. 3). In certain embodiments, step 610 is performed by the computing device of step 510. In certain embodiments, step 610 is performed by Applicants' replication algorithm encoded in a computer readable medium disposed in the computing device of step 510. In certain embodiments, step 610 is performed by Applicants' replication algorithm encoded in a computer readable medium disposed in a storage controller in communication with the computing device of step 510.

In step 620, the method selects, seriatim for each value of (i), an (i)th virtual volume, wherein that (i)th virtual volume comprises (M) files, wherein (M) is greater than 1. In certain embodiments, step 620 is performed by the computing device of step 510. In certain embodiments, step 620 is performed by Applicants' replication algorithm encoded in a computer readable medium disposed in the computing device of step 510. In certain embodiments, step 620 is performed by Applicants' replication algorithm encoded in a computer readable medium disposed in a storage controller in communication with the computing device of step 510.

In step 630, the method selects, seriatim for each value of (j), a (j)th file written to an (i)th virtual volume selected in step 620, wherein (j) is greater than or equal to 1 and less than or equal to (M). In certain embodiments, step 630 is performed by the computing device of step 510. In certain embodiments, step 630 is performed by Applicants' replication algorithm encoded in a computer readable medium disposed in the computing device of step 510. In certain embodiments, step 630 is performed by Applicants' replication algorithm encoded in a computer readable medium disposed in a storage controller in communication with the computing device of step 510.

In step 640, if the computing device of step 510 has access rights to the (j)th file of step 630, the method associates in the computing device file access database of step 610 that (j)th file with the computing device. In certain embodiments, step 640 is performed by the computing device of step 510. In certain embodiments, step 640 is performed by Applicants' replication algorithm encoded in a computer readable medium disposed in the computing device of step 510. In certain embodiments, step 640 is performed by Applicants' replication algorithm encoded in a computer readable medium disposed in a storage controller in communication with the computing device of step 510.

In step 650, after examining each file written to each virtual volume, the method encodes the computing device file access database in the computing device of step 510. In certain embodiments, step 650 is performed by the computing device of step 510. In certain embodiments, step 650 is performed by Applicants' replication algorithm encoded in a computer readable medium disposed in the computing device of step 510. In certain embodiments, step 650 is performed by Applicants' replication algorithm encoded in a computer readable medium disposed in a storage controller in communication with the computing device of step 510.

In step 660, the method copies, for each value of (i), an (i)th virtual volume of step 510 to an (i)th physical volume of step 580. In certain embodiments, step 660 is performed by the computing device of step 510. In certain embodiments, step 660 is performed by Applicants' replication algorithm encoded in a computer readable medium disposed in the computing device of step 510. In certain embodiments, step 660 is performed by Applicants' replication algorithm encoded in a computer readable medium disposed in a storage controller in communication with the computing device of step 510.

In step 670, the method, for each value of (i), configures an (i)th physical volume using an (i)th volume configuration of step 560. In certain embodiments, step 670 is performed by the computing device of step 510. In certain embodiments, step 670 is performed by Applicants' replication algorithm encoded in a computer readable medium disposed in the computing device of step 510. In certain embodiments, step 670 is performed by Applicants' replication algorithm encoded in a computer readable medium disposed in a storage controller in communication with the computing device of step 510.

In step 680, the method, for each value of (i), quiesces and deletes an (i)th virtual volume. In certain embodiments, step 680 is performed by the computing device of step 510. In certain embodiments, step 680 is performed by Applicants' replication algorithm encoded in a computer readable medium disposed in the computing device of step 510. In certain embodiments, step 680 is performed by Applicants' replication algorithm encoded in a computer readable medium disposed in a storage controller in communication with the computing device of step 510.

In step 690, the method, for each value of (i), assigns an (i)th volume identifier of step 540, to an (i)th physical volume of step 580. After all (N) volume identifiers have been assigned to the (N) physical volumes in step 690, all (N) remote virtual volumes of step 510 have been replicated to (N) local physical volumes, and the computing device of step 510 does not need to be reconfigured to access any of the plurality of files 222, 232, and/or 242, now available on physical volumes 322, 324, and 326, respectively. Rather, computing device 210 can utilize the same volume identifiers and file names that were previously used to access file written to the remote virtual volumes.

In certain embodiments, individual steps recited in FIGS. 5 and/or 6 may be combined, eliminated, or reordered.

In certain embodiments, Applicants' storage controller comprises computer readable program code, such as computer readable program code 138 (FIGS. 2, 3, 4), residing in computer readable medium, such as for example computer readable medium 133 (FIG. 1) and/or 143 (FIG. 1) and/or 214 (FIGS. 2, 3, 4) wherein that computer readable program code is executed by a processor, such as processor 132 (FIGS. 1, 2, 3, 4) and/or 142 (FIG. 1) and/or 212 (FIGS. 2, 3, 4), to perform one or more of steps 520, 530, 540, 550, 560, 570, 580, and/or 590, recited in FIGS. 5A and 5B, and/or one or more of steps 610, 620, 630, 640, 650, 660, 670, 680, and/or 690, recited in FIG. 6.

In other embodiments, Applicants' invention includes computer readable program code, i.e. Applicants' replication algorithm, residing in any other computer program product, where those instructions are executed by a computer external to, or internal to, computing device 210 and/or storage controller 200, to perform one or more of steps 520, 530, 540, 550, 560, 570, 580, and/or 590, recited in FIGS. 5A and 5B, and/or one or more of steps 610, 620, 630, 640, 650, 660, 670, 680, and/or 690, recited in FIG. 6. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

In certain embodiments, Applicants' replication algorithm comprises a code base encoding a interactable graphical object. When that code base is executed, the interactable graphical objects is displayed on an interconnected visual display device. When that interactable graphical object is activated, using for example and without limitation a computer mouse or pointing device, the replication algorithm is executed and performs steps 520, 530, 540, 550, 560, 570, 580, and 590, recited in FIGS. 5A and 5B, and steps 610, 620, 630, 640, 650, 660, 670, 680, and, 690, recited in FIG. 6, without any further or additional operator input, i.e. without any further or additional manual input.

In certain embodiments, Applicants' replication algorithm may display a query to ask whether to authorize the replication algorithm to perform step 580, or whether to manually perform step 580. If the user elects manual execution of step 580, then the replication algorithm displays a query requesting identification of (N) local physical volumes selected by the user.

In certain embodiments, Applicants' replication algorithm, represented by computer readable program code 138, is executed using computing device 210. In certain embodiments, Applicants' replication algorithm, represented by computer readable program code 138, is executed using storage controller 200. In certain embodiments, Applicants' replication algorithm, represented by computer readable program code 138, is executed using data storage library 100.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to replicate remote virtual files to local physical files, comprising:
providing (N) remote virtual volumes, wherein a computing device can read data from, and write data to, each of said (N) remote virtual volumes;
replicating without manual input said (N) remote virtual volumes to (N) local physical volumes, such that said computing device can read data from, and write data to, each of said (N) remote virtual volumes without modifying volume assignments and without reconfiguring the computing device to communicate with said (N) local physical volumes;
wherein said replicating step further comprises:
determining a value of (N);
selecting, for each value of (i), an (i)th remote virtual volume, wherein (i) is greater than or equal to 1 and less than or equal to (N);
determining, for each value of (i), an (i)th volume identifier;
determining, for each value of (i), an (i)th volume size;
determining, for each value of (i), an (i)th volume configuration;
determining, for each value of (i), if an available local physical volume in communication with said computing device comprises said (i)th volume size;
operative if an available local physical volume comprises said (i)th volume size, designating said local physical volume as an (i)th physical volume and unavailable;
operative if available local physical volumes do not comprise, for each value of (i), a local physical volume comprising said (i)th volume size:
setting a polling time interval;
determining at an expiration of said polling time interval, if, for each value of (i), an available local physical volume comprises said (i)th volume size;
operative if at an expiration of said polling time interval available local physical volumes do not comprise, for each value of (i), a local physical volume comprising said (i)th volume size, ending.

2. The method of claim 1, wherein said replicating step further comprises:
forming a computing device file access database;
selecting, for each value of (i), an (i)th remote virtual volume, wherein said selected (i)th remote virtual volume comprises (M) files, wherein (M) is greater than 1;
selecting, for each value of (j), a (j)th file from said (M) files, wherein (j) is greater than or equal to 1 and less than or equal to (M);
determining if said computing device has access rights for said (j)th file;
operative if said computing device has access rights to said (j)th file, associating said computing device with said (j)th file in said computing device file access database.

3. The method of claim 2, wherein said replicating step further comprises:
determining if, for each value of (i), said (i)th volume identifier has been assigned to an (i)th physical volume;
operative if, for each value of (i), said (i)th volume identifier has been assigned to an (i)th physical volume:
copying, for each value of (i), said (i)th plurality of files from said (i)th remote virtual volume to said (i)th physical volume.

4. The method of claim 3, wherein said replicating step further comprises:
determining, for each value of (i), an (i)th remote virtual volume configuration;
configuring said (i)th physical volume using said (i)th remote virtual volume configuration.

5. The method of claim 3, wherein said replicating step further comprises:
for each value of (i), quiescing and deleting said (i)th remote virtual volume; and
assigning said (i)th volume identifier to said (i)th physical volume.

6. The method of claim 5, wherein said replicating step further comprises encoding in said computing device said computing device file access database.

7. A storage controller comprising a computer readable medium comprising computer readable program code encoded therein to replicate remote virtual volumes to local volumes, wherein a computing device can read data from, and write data to, each of the remote virtual volumes, the computer readable program code comprising a series of computer readable program steps to effect replicating without manual input (N) remote virtual volumes to (N) local physical volumes, such that said computing device can read data from, and write data to, each of said (N) remote virtual volumes without modifying volume assignments and without reconfiguring the computing device to communicate with said (N) local physical volumes;
wherein said computer readable program code to replicate said (N) remote virtual volumes to (N) local physical volumes further comprising a series of computer readable program steps to effect:
determining a value of (N);
selecting, for each value of (i), an (i)th remote virtual volume, wherein (i) is greater than or equal to 1 and less than or equal to (N);
determining, for each value of (i), an (i)th volume identifier;
determining, for each value of (i), an (i)th volume size;
determining, for each value of (i), an (i)th volume configuration;
determining, for each value of (i), if an available local physical volume in communication with said computing device comprises said (i)th volume size;
operative if an available local physical volume comprises said (i)th volume size, designating said local physical volume as:
an (i)th physical volume, and unavailable;
wherein said computer readable program code to determine if an available local physical volume in communication with said computing device comprises said (i)th volume size further comprises a series of computer readable program steps to effect:
operative if available local physical volumes do not comprise, for each value of (i), a local physical volume comprising said (i)th volume size:
setting a polling time interval;
determining at an expiration of said polling time interval, if, for each value of (i), an available local physical volume comprises said (i)th volume size;
operative if at an expiration of said polling time interval available local physical volumes do not comprise, for each value of (i), a local physical volume comprising said (i)th volume size, not replicating said remote virtual volumes to said local volumes.

8. The storage controller of claim 7, wherein said (i)th remote virtual volume comprises (M) files, said computer readable program code to replicate said (N) remote virtual volumes to (N) local physical volumes further comprising a series of computer readable program steps to effect:
  forming a computing device file access database;
  selecting a (j)th file from said (M) files, wherein (j) is greater than or equal to 1 and less than or equal to (M);
  determining if said computing device has access rights for said (j)th file;
  operative if said computing device has access rights to said (i)th file, associating said computing device with said (j)th file in said computing device file access database.

9. The storage controller of claim 8, said computer readable program code to replicate said (N) remote virtual volumes to (N) local physical volumes further comprising a series of computer readable program steps to effect:
  determining if, for each value of (i), said (i)th volume identifier has been assigned to an (i)th physical volume;
  operative if, for each value of (i), said (i)th volume identifier has been assigned to an (i)th physical volume:
  copying, for each value of (i), said (i)th plurality of files from said (i)th remote virtual volume to said (i)th physical volume.

10. The storage controller of claim 9, said computer readable program code to replicate said (N) remote virtual volumes to (N) local physical volumes further comprising a series of computer readable program steps to effect:
  determining, for each value of (i), an (i)th remote virtual volume configuration;
  configuring said (i)th physical volume using said (i)th remote virtual volume configuration.

11. The storage controller of claim 10, said computer readable program code to replicate said (N) remote virtual volumes to (N) local physical volumes further comprising a series of computer readable program steps to effect:
  for each value of (i), quiescing and deleting said (i)th remote virtual volume;
  assigning said (i)th volume identifier to said (i)th physical volume;
  encoding in said computing device said computing device file access database.

12. A computer program product encoded in a computer readable medium and useable with a programmable computer processor to replicate remote virtual volumes to local volumes, wherein a computing device can read data from, and write data to, each of said remote virtual volumes, the computer program product comprising:
  computer readable program code which causes said programmable processor to replicate without manual input (N) remote virtual volumes to (N) local physical volumes, such that said computing device can read data from, and write data to, each of said (N) remote virtual volumes without modifying volume assignments and without reconfiguring the computing device to communicate with said (N) local physical volumes;
  wherein said computer readable program code to replicate said (N) remote virtual volumes to (N) local physical volumes further comprises:
  computer readable program code which causes said programmable processor to determine a value of (N);
  computer readable program code which causes said programmable processor to select, for each value of (i), an (i)th remote virtual volume, wherein (i) is greater than or equal to 1 and less than or equal to (N);
  computer readable program code which causes said programmable processor to determine, for each value of (i), an (i)th volume identifier;
  computer readable program code which causes said programmable processor to determine, for each value of (i), an (i)th volume size;
  computer readable program code which causes said programmable processor to determine, for each value of (i), an (i)th volume configuration;
  computer readable program code which causes said programmable processor to determine if an available local physical volume in communication with said computing device comprises said (i)th volume size;
  computer readable program code which, if an available local physical volume comprises said (i)th volume size, causes said programmable processor to designate said local physical volume as:
  an (i)th physical volume, and unavailable;
  computer readable program code which, if available local physical volumes do not comprise, for each value of (i), a local physical volume comprising said (i)th volume size, causes said programmable processor to set a polling time interval and determine at an expiration of said polling time interval, if, for each value of (i), an available local physical volume comprises said (i)th volume size;
  computer readable program code which, if at an expiration of said polling time interval available local physical volumes do not comprise, for each value of (i), a local physical volume comprising said (i)th volume size, causes said programmable processor to terminate replication of said remote virtual volumes to said local physical volumes.

13. The computer program product of claim 12, wherein said (i)th remote virtual volume comprises (M) files, said computer readable program code to replicate said (N) remote virtual volumes to (N) local physical volumes further comprises:
  computer readable program code which causes said programmable processor to form a computing device file access database;
  computer readable program code which causes said programmable processor to select a (j)th file from said (M) files, wherein (j) is greater than or equal to 1 and less than or equal to (M);
  computer readable program code which causes said programmable processor to determine if said computing device has access rights for said (j)th file;
  computer readable program code which, if said computing device has access rights to said (i)th file, causes said programmable processor to associate said computing device with said (j)th file in said computing device file access database.

14. The computer program product of claim 13, said computer readable program code to replicate said (N) remote virtual volumes to (N) local physical volumes further comprises:
  computer readable program code which causes said programmable processor to determine if, for each value of (i), said (i)th volume identifier has been assigned to an (i)th physical volume;
  computer readable program code which, if said (i)th volume identifier has been assigned to an (i)th physical volume, causes said programmable processor to copy said (i)th plurality of files from said (i)th remote virtual volume to said (i)th physical volume.

15. The computer program product of claim 14, said computer readable program code to replicate said (N) remote virtual volumes to (N) local physical volumes further comprises:

computer readable program code which causes said programmable processor to determine, for each value of (i), an (i)th remote virtual volume configuration;

computer readable program code which, for each value of (i), causes said programmable processor to configure said (i)th physical volume using said (i)th remote virtual volume configuration.

16. The computer program product of claim 15, said computer readable program code to replicate said (N) remote virtual volumes to (N) local physical volumes further comprises:

computer readable program code which causes said programmable processor to for each value of (i), quiesce and delete said (i)th remote virtual volume;

computer readable program code which, for each value of (i), causes said programmable processor to assign said (i)th volume identifier to said (i)th physical volume;

computer readable program code which causes said programmable processor to encode in said computing device said computing device file access database.

* * * * *